R. R. LANGLEY.
LISTER PLANTER.
APPLICATION FILED MAR. 17, 1910.
1,024,345.
Patented Apr. 23, 1912.
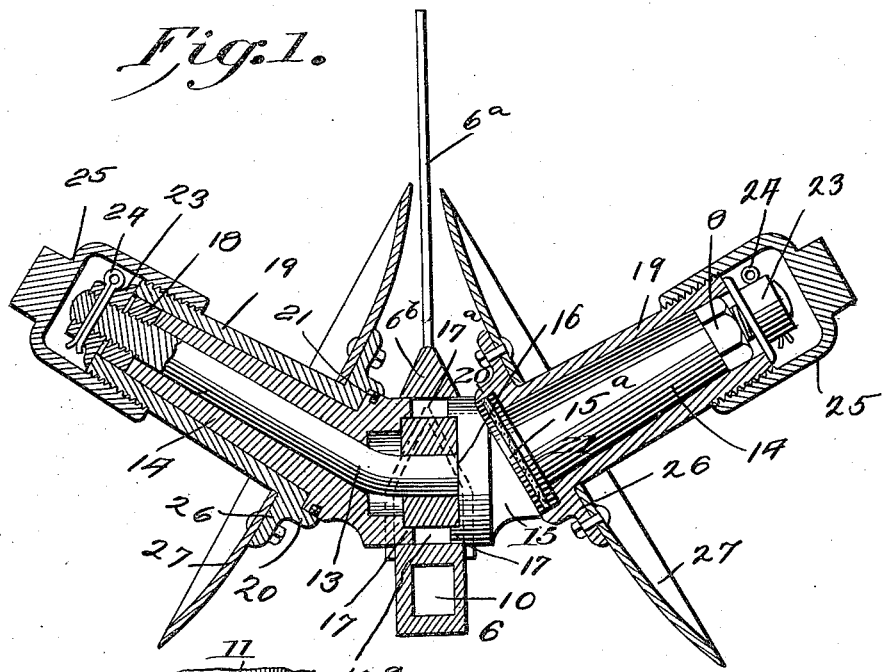
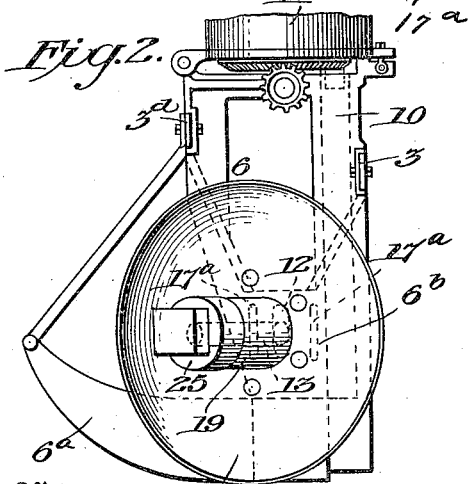
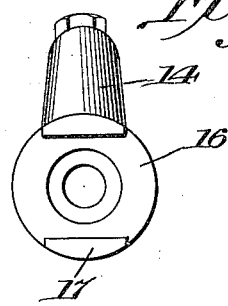
Witnesses
Inventor
R. R. Langley
By H. H. Bliss
Attorney

UNITED STATES PATENT OFFICE.

RALPH R. LANGLEY, OF LINCOLN, NEBRASKA.

LISTER-PLANTER.

1,024,345.  Specification of Letters Patent.  Patented Apr. 23, 1912.

Application filed March 17, 1910. Serial No. 550,070.

*To all whom it may concern:*

Be it known that I, RALPH R. LANGLEY, a citizen of the United States, residing at Lincoln, in the county of Lancaster and State of Nebraska, have invented certain new and useful Improvements in Lister-Planters, of which the following is a specification, reference being had therein to the accompanying drawing.

My invention relates to planters and more particularly to loose ground listers for potatoes or corn.

This invention has as its object to provide improved means for mounting the furrow opening disks used on such planters.

More specifically the object of the invention is to provide improved means for holding the disks in a fixed position of adjustment with respect to the lines of travel of the machine, but, at the same time, freely adjustable vertically.

Figure 1 is a cross sectional plan view of the furrow opening disks and supporting devices. Fig. 2 is a side elevation on a reduced scale of the parts shown in Fig. 1. Fig. 3 is an end view of one of the axle boxes.

My invention relates particularly to the seed depositing mechanism and associated parts, and I have therefore shown in the drawings only those parts of a planter which are necessary for a ready and complete understanding of the invention.

The particular seeding mechanism shown in the drawings is adapted for use in planting corn. Between the bars 3, 3$^d$ of the planter frame and in the same vertical longitudinal plane with the planter wheels are bolted shanks, one of which is indicated by 6. Each of these shanks is an open metallic frame provided with appropriate strengthening ribs and otherwise shaped to possess the maximum of strength, and at the same time to have the various parts necessary for the work which it is intended to perform. The rear vertical member of the shank is made tubular to form a duct or passageway 10, which communicates at its upper end with a seed box 11, which is mounted upon the shank and which feeds the seed at regular intervals to the duct 10 by means of the mechanism usually employed for that purpose. An ordinary corn planter shoe or runner 6$^a$ is secured to the lower end of the shank 6. The lower plate 6$^b$ of each shank 6 is provided with a vertically elongated slot 12, through which an axle 13 is passed for the support of the furrow opening disks 27. The end parts of the axle are bent through small angles with respect to the middle part and are so disposed that they will project forward at each side of the shank at an angle to the vertical plane of the shank. The two end parts of the axles lie in the same plane, which is substantially horizontal. On each end part of the axle 13, an axle box 14 is located, provided with an enlarged inner end 15. This enlarged inner end is made with a collar 15$^a$ in a plane perpendicular to the axis of the end part of the axle and with a beveled inner end face 16 adapted to lie in a vertical plane parallel to the plane of the shank. This inner end face 16 is provided with two lugs 17 which enter two slots 17$^a$ respectively, which are formed in the plate 6$^b$ parallel to and one upon each side of the elongated slot 12. The lugs 17 are so disposed on the end face 16 with respect to its angle of inclination to the axis of the axle box that the axle box and the axle within it shall always lie in substantially horizontal planes and shall project forward at the same angle to the plane of the shank irrespective of the vertical position of the axle within the slot 12. Nuts 18 are screwed on the forwardly projecting end parts of the axle and bear against the outer ends of the boxes 14, forcing the latter into locked engagement with the shoe 6. Hubs 19 are mounted to rotate on the axle-boxes and are provided at their inner ends with integral flanges 20 which overlap the collars 15$^a$ of the said axle boxes. Between the flanges 20 and the collars 15$^a$ of the axle boxes suitable dust proof packings 21 are disposed. The hubs 19 are held in place by caps 23 slipped over the ends of the axle end parts and bearing against the outer ends of the hubs. These caps are prevented from displacement by means of cotter pins or keys 24. A dust proof cap 25 is screwed on the outer end of each hub and incloses the outer end of the axle and the cap 23. The caps 25 may be filled with a solid lubricant to supply the bearing surfaces between the hubs 19 and the axle boxes 14. Each hub 19 is provided at its inner end with an annular flange 26 to which a furrow opening disk 27 is securely bolted.

With the construction and arrangement of parts above described, it will be seen that when the nuts 18, at the ends of the axle members, are loosened, the axle boxes can be disengaged from their locked connection with the shank 6 and the axle raised or lowered in the slot 12 for the purpose of raising or lowering the furrow opening disks and thus regulating the depth of earth covering the seed.

I have found it desirable for some kinds of planting to use furrow opening disks capable of vertical adjustment only. The mechanism above described provides for the proper mounting of disks of that character. The angle at which the two ends of the axle are inclined to each other determines the permanent inclination of the plane of the disks to the horizontal lines of travel of the planter.

I have found it preferable to so construct the parts of the mounting devices that the disks shall be substantially vertical but inclined to the vertical central longitudinal plane of each of said dropping mechanisms at a considerable angle. When the disks are mounted as above described, this angle is constant, while the disks are changed from one position of adjustment to another. It will be apparent, then, that the depth of the earth covering the seed can be regulated freely without changing or interfering in any way with the adjustment of the disks with respect to the distance between them or the angular adjustment of the disks with respect to the lines of travel of the planter as a whole.

What I claim is:

1. In a planting machine, the combination with a seed tube shank having formed therein a vertical slot, of an axle comprising an intermediate portion and end portions integral with the intermediate portion and projecting at an angle therefrom, said intermediate portion being mounted in the said vertical slot, furrow opening disks carried by the end portions of the axle, and two sleeves interposed between the disks and the axle, and having lugs on the inner ends, the said tube shank being formed with vertical guideways to receive the said lugs whereby the disks may be adjusted vertically while maintaining a single permanent angular relation to the lines of travel of the machine.

2. In a planting machine, the combination with a seed tube shank having formed therein a vertical slot, of an axle comprising an intermediate portion and end portions integral with the intermediate portion and projecting at an angle therefrom, said intermediate portion being mounted in the said vertical slot and capable of vertical adjustment therein, of devices upon the axle engaging the said tube shank in such a manner as to permit vertical adjustment of the axle, and to prevent angular movement of the axle, and locking devices for releasing the said adjusting device for permitting vertical adjustment without permitting angular movement, and furrow opening disks carried by the two end portions of the axle.

3. In a planting machine, the combination with a seed tube shank formed with a vertical slot, of an axle comprising an intermediate portion and an end portion rigid with the intermediate portion and projecting at an angle therefrom, said intermediate portion being mounted in the said vertical slot and being vertically adjustable therein, axle boxes one upon each end of the axle and each being rigidly secured to its inner end, devices mating with coöperating parts upon the said tube shank so as to permit vertical adjustment of the axle while preventing angular movement thereof, nuts, one for each end of the axle, the axle being threaded to receive the same, said nuts being adapted to hold the said axle boxes in engagement with the said tube shank, and furrow opening disks carried by the two end portions of the axle.

4. In a planting machine, the combination with a seed tube shank formed with a vertically extending transverse slot, of an axle having a portion extending horizontally through the slot and adjustable therein, and an end portion rigid with the first named portion and projecting at an angle therefrom, an axle box upon the said end portion of the axle and provided with devices at its inner end for engaging with coöperating parts on the tube shank to permit vertical adjustment of the axle while preventing angular movement thereof, a furrow opening disk carried by the said axle and axle box, and means for clamping the said axle and axle box in vertically adjusted position upon the shank.

In testimony whereof I affix my signature, in presence of two witnesses.

RALPH R. LANGLEY.

Witnesses:
 OSCAR G. STUTHEIT,
 MARK WARD.

Copies of this patent may be obtained for five cents each, by addressing the "Commissioner of Patents, Washington, D. C."